(12) United States Patent
Jung et al.

(10) Patent No.: US 11,665,281 B2
(45) Date of Patent: May 30, 2023

(54) CALL RECOMMENDATION SYSTEM AND CALL RECOMMENDATION METHOD BASED ON ARTIFICIAL INTELLIGENCE

(71) Applicants: Byung Kwan Jung, Seoul (KR); Mi Sung Cho, Seoul (KR)

(72) Inventors: Byung Kwan Jung, Seoul (KR); Mi Sung Cho, Seoul (KR)

( * ) Notice: Subject to any disclaimer, the term of this patent is extended or adjusted under 35 U.S.C. 154(b) by 290 days.

(21) Appl. No.: 17/153,054

(22) Filed: Jan. 20, 2021

(65) Prior Publication Data

US 2021/0274043 A1 Sep. 2, 2021

(30) Foreign Application Priority Data

Feb. 27, 2020 (KR) ........................ 10-2020-0024595
Apr. 13, 2020 (KR) ........................ 10-2020-0044833

(51) Int. Cl.
*H04M 3/51* (2006.01)
*H04M 15/00* (2006.01)
(Continued)

(52) U.S. Cl.
CPC ............ *H04M 3/5175* (2013.01); *G06N 3/08* (2013.01); *G06N 20/00* (2019.01); *H04M 15/49* (2013.01);
(Continued)

(58) Field of Classification Search
CPC ............... H04M 3/5175; H04M 15/49; H04M 15/8044; H04M 2215/745; H04M 15/06;
(Continued)

(56) References Cited

U.S. PATENT DOCUMENTS 10,855,561 B2 * 12/2020 Monahan ............ H04L 41/5051
10,936,947 B1 *  3/2021 Flunkert ................ G06N 3/044
(Continued)

FOREIGN PATENT DOCUMENTS

CN          108023919 A  *  5/2018  ............ H04L 67/18
KR     10-2015-0045962       4/2015
(Continued)

OTHER PUBLICATIONS

English Specification of 10-2018-0100824.
(Continued)

*Primary Examiner* — Akelaw Teshale
(74) *Attorney, Agent, or Firm* — Antonio Ha & U.S. Patent, LLC (57) ABSTRACT

A call recommendation system based on artificial intelligence is provided. The call recommendation system includes a data collecting unit, a matching time predicting unit, a price determining unit, and a final ranking determining unit. When a service is requested from a service user, the data collecting unit collects first past data indicating a past location of the service user, first present data indicating a present location of the service user, second past data indicating a past location of a service provider, and second present data indicating a present location of the service provider. The matching time predicting unit inputs the first and second past data and the first and second present data to a recurrent neutral network (RNN) leaning model to predict a future location of the service user and a future location of the service provider and inputs first prediction data regarding the future location of the service user and second prediction data regarding the future location of the service provider to a prediction learning model to predict, when the service provider selects a service, a matching time required until the service provider is matched with a next service user after the service provider completes the service. The price
(Continued)

determining unit determines a price for the service such that the price increases as the matching time increases. The final ranking determining unit determines a recommendation rating (or a recommendation priority) of a service among services required for the service provider based on preference data indicating preference of the service provider regarding a service and a price. The RNN learning model and the prediction learning model are based on a deep learning algorithm.

9 Claims, 6 Drawing Sheets

(51) Int. Cl.
 *G06N 20/00* (2019.01)
 *G06N 3/08* (2023.01)
(52) U.S. Cl.
 CPC ............... *H04M 15/8044* (2013.01); *H04M 2215/745* (2013.01)
(58) Field of Classification Search
 CPC ..... H04M 15/8033; G06N 3/08; G06N 20/00; G06N 3/0445; G06N 3/0454; H04W 4/24
 See application file for complete search history.

(56) References Cited

U.S. PATENT DOCUMENTS

| | | | |
|---|---|---|---|
| 11,120,361 B1* | 9/2021 | Januschowski | G06N 20/00 |
| 11,210,719 B2* | 12/2021 | You | G06Q 50/01 |
| 11,281,969 B1* | 3/2022 | Rangapuram | G06N 7/01 |
| 11,423,421 B1* | 8/2022 | Pandey | G06F 17/18 |
| 2013/0031001 A1* | 1/2013 | Frechette | G06Q 30/0625 707/769 |
| 2014/0229391 A1* | 8/2014 | East, III | G06Q 10/20 705/305 |
| 2017/0293610 A1* | 10/2017 | Tran | G06Q 10/109 |
| 2018/0032928 A1 | 2/2018 | Li et al. | |
| 2019/0065969 A1* | 2/2019 | Shaw | H04N 21/4516 |
| 2019/0092171 A1* | 3/2019 | Netzer | G06Q 10/047 |
| 2019/0295549 A1* | 9/2019 | Oh | H04W 4/021 |
| 2020/0126540 A1* | 4/2020 | Panchamgam | G10L 15/26 |
| 2020/0158524 A1* | 5/2020 | Joo | G06Q 10/02 |
| 2021/0224912 A1* | 7/2021 | Wang | G06N 3/08 |
| 2021/0279852 A1* | 9/2021 | Jakka | G06F 18/2413 |

FOREIGN PATENT DOCUMENTS

| | | | | |
|---|---|---|---|---|
| KR | 20150045962 A | * | 4/2015 | ............ H04L 67/18 |
| KR | 20150048478 A | * | 4/2015 | |
| KR | 20200011109 A | * | 7/2018 | |
| KR | 10-2018-0100824 | | 9/2018 | |
| KR | 10-2019-0020852 | | 3/2019 | |
| KR | 10-2020-0011109 | | 2/2020 | |

OTHER PUBLICATIONS

English Specification of 10-2019-0020852.
English Specification of 10-2015-0045962.
English Specification of 10-2020-0011109.

\* cited by examiner

CALL RECOMMENDATION SYSTEM AND CALL RECOMMENDATION METHOD BASED ON ARTIFICIAL INTELLIGENCE

CROSS-REFERENCE TO RELATED APPLICATION(S)

This application claims priority to Korean Patent Application Nos. 10-2020-0024595, filed on Feb. 27, 2020, and 10-2020-0044833, filed on Apr. 13, 2020, in the Korean Intellectual Property Office, the disclosures of which are incorporated by reference herein in their entireties.

BACKGROUND OF THE INVENTION

Field of the Invention

The present disclosure relates to a call recommendation system, and more particularly, to a call recommendation system based on artificial intelligence.

Related Art

In recent years, a transport service industry using transport means has prospered. For example, transport services include a taxi service in which a service provider brings a customer to a destination using his/her own vehicle, a chauffeur service that brings a customer to a destination by driving the customer's vehicle on behalf of the customer, or a quick service that transports various cargos.

Such transport services require matching between a service user who intends to use the service and a service provider who wants to provide the service. Specifically, the service user may request a service from the service provider using a phone, an application, or the like. In addition to the service request, the service provider may receive information on a requested service, such as a destination of the service user, a present location of the service user, and the like. The service provider may determine whether to approve the service request based on the information of the service. When the service provider approves the service request, the service provider and the service requester are matched, so that the service requester may receive a service from the service provider.

As demand for such a transport service increases, the service provider may receive multiple service requests at the same time. In this case, the service provider may have difficulty in selecting a service request that best suits its preference from among the multiple service requests. Therefore, a system and method for recommending a service request to a service provider according to preference of the service provider.

SUMMARY OF THE INVENTION

An aspect of the present disclosure provides a call recommendation system and a call recommendation method based on artificial intelligence.

In an aspect, a call recommendation system may include a data collecting unit, a matching time predicting unit, a price determining unit, and a final ranking determining unit. When a service is requested from a service user, the data collecting unit may collect first past data indicating a past location of the service user, first present data indicating a present location of the service user, second past data indicating a past location of a service provider, and second present data indicating a present location of the service provider. The matching time predicting unit may input the first and second past data and the first and second present data to a recurrent neutral network (RNN) leaning model to predict a future location of the service user and a future location of the service provider and input first prediction data regarding the future location of the service user and second prediction data regarding the future location of the service provider to a prediction learning model to predict, when the service provider selects a service, a matching time required until the service provider is matched with a next service user after the service provider completes the service. The price determining unit may determine a price for the service such that the price increases as the matching time increases. The final ranking determining unit may determine a recommendation rating (or a recommendation priority) of a service among services required for the service provider based on preference data indicating preference of the service provider regarding a service and a price. The RNN learning model and the prediction learning model may each be based on a deep learning algorithm.

In another aspect, a call recommendation method implemented by a computer may include: collecting, by the call recommendation system, first past data indicating a past location of a service user, first present data indicating a present location of the service user, second past data indicating a past location of a service provider, and second present data indicating a present location of the service provider, when a service is requested from the service user; inputting, by the call recommendation system, the first past data, the first present data, the second past data, and the second present data to a recurrent neural network (RNN) learning model to predict a future location of the service user and a future location of the service provider and inputting first prediction data regarding a future location of the service user and second prediction data regarding a future location of the service provider into a prediction learning model to predict a matching time required until the service provider is matched with a next service user after the service provider completes the service; calculating, by the call recommendation system, a price for the service such that the price increases as the matching time for the service increases; and determining, by the call recommendation system, a recommendation rating of the service among services required for the service provider based on preference data indicating a preference of the service provider regarding the service and the price. The RNN learning model and the prediction learning model may be based on a deep learning algorithm.

The call recommendation system according to an embodiment of the present disclosure may recommend a call that suits a preference of the service provider to a service provider based on artificial intelligence.

Specifically, the call recommendation system may predict locations of a service provider and a service user using a recurrent neural network (RNN) algorithm. The call recommendation system may predict a matching time until a next call is matched based on the predicted positions of the service provider and the service user. The call recommendation system may flexibly determine a price of the call based on a current call matching situation and the predicted matching time. The call recommendation system may determine ratings of calls requested for the service provider based on the determined price of the call and the preference of the service provider.

Accordingly, the service provider may select a call that suits his or her preference using the call recommendation system.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE EMBODIMENTS

Hereinafter, embodiments of the present disclosure will be described clearly in detail to the extent that a person skilled in the art may easily implement the present disclosure.

Figure 1:
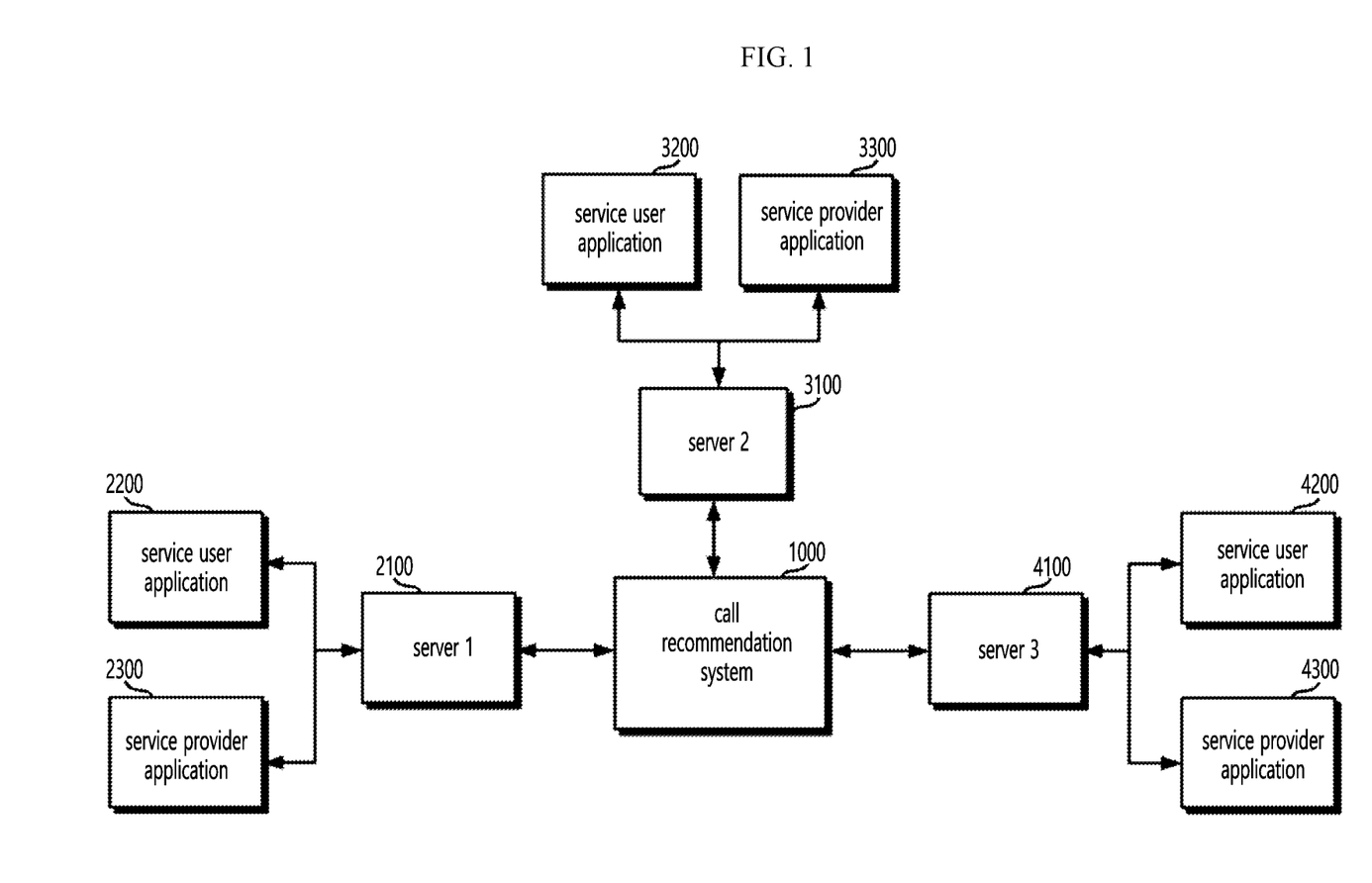
FIG. 1 is a conceptual diagram illustrating a call recommendation system according to an embodiment of the present disclosure.

FIG. 1 is a conceptual diagram illustrating a call recommendation system according to an embodiment of the present disclosure.

The present disclosure provides a call recommendation method and a call recommendation system 1000 capable of efficiently matching a service user and a service provider in a transport service using a transport means. In this disclosure, the "transport service" refers to a service that a service provider provides to a service user using a transport means such as a taxi service in which a service provider brings a service user to a destination using his/her own vehicle, a chauffeur service that brings a service user to a destination by driving the service user's vehicle on behalf of the service user, or a quick service that transports various cargoes to a service user. In this disclosure, the "service user" refers to a customer who requests a service and the "service provider" refers to a driver who provides a service.

The service user may request a service using a service user application 2200. The service user application 2200 may be a program installed in an electronic device of the service user. When the service user requests a service, the service user application 2200 may transmit a service request of the service user to the call recommendation system 1000 through a server 2100.

The call recommendation system 1000 may receive the service request from the service user through the server 2100. In this disclosure, receiving the service request may refer to receiving a call.

Other service users may also request a service through service user applications 3200 and 4200, respectively. Servers 3100 and 4100 provide substantially the same operations as that of the server 2100. The service user applications 3200 and 4200 may provide substantially the same operations as that of the service user application 2200 but may be different types of applications. The service provider applications 3300 and 4300 may also provide substantially the same operations as that of a service provider application 2300 but may be different types of applications.

When a call is received, the call recommendation system 1000 may receive location information of service users and location information of service providers through the servers 2100, 3100, and 4100. The server 2100 may collect location information of a service user and location information of a service provider using the service user application 2200 and the service provider application 2300. The service user application 2200 and the service provider application 2300 may be programs installed in an electronic device carried by the service user and an electronic device carried by the service provider, respectively. The service user application 2200 and the service provider application 2300 may receive location information from a GPS device installed in the electronic device carried by the service user and the electronic device carried by the service provider.

Also, when a call is received, the call recommendation system 1000 may receive preference data of service providers through the servers 2100, 3100, and 4100. The preference data may be information on a destination, a driving time, a driving distance, a price, and the like preferred by a service provider. The call recommendation system 1000 may determine ratings of received calls according to the preference of the service provider using location information and preference information received from the servers 2100, 3100, and 4100. The call recommendation system 1000 may determine ratings of the received calls based on artificial intelligence. In this disclosure, "artificial intelligence" refers to a technology that realizes human learning ability, reasoning ability, perceptual ability, and understanding ability of natural language through a computer program. As an example, the call recommendation system 1000 may use a deep learning algorithm having a neural network structure. The deep learning algorithm used in the call recommendation system 1000 will be described in detail with reference to FIGS. 2 to 5.

The call recommendation system 1000 may determine the rank of the received calls according to the preference of the service provider, using the location information and preference information received from the servers 2100, 3100, and 4100. The call recommendation system 1000 may determine a rating of received calls based on artificial intelligence. In this disclosure, "artificial intelligence" refers to a technology that realizes human learning ability, reasoning ability, perceptual ability, and understanding ability of natural language through a computer program. As an example, the call recommendation system 1000 may use a deep learning algorithm having a neural network structure. The deep learning algorithm used in the call recommendation system 1000 will be described in detail with reference to FIGS. 2 to 5.

The call recommendation system 1000 may transmit rating information of calls to the service provider application 2300 through the server 2100. The service provider may obtain the rating information through the service provider application 2300. The service provider may select a call that suits his or her preference through the service provider application 2300 based on the rating information. When the service provider selects the call, a service user who requested the call and the service provider who selected the call may be matched with each other.

When the service provider selects the call, the call recommendation system 1000 may receive information on the call actually selected by the service provider. The call recommendation system 1000 may train an artificial intelligence model used in the call recommendation system 1000 using the information on the call actually selected by the service provider. That is, the information on the actually selected call may be used as correct answer information. A structure and operation of the call recommendation system 1000 will be described in detail with reference to FIGS. 2 to 6.

The components 1000, 2100 to 2300, 3100 to 3300, and 4100 to 4300 of FIG. 1 may be connected through a network. In the present disclosure, "network" refers to a connection structure in which nodes such as a plurality of terminals and servers may exchange information with each other. As an example, the network may include RF, $3^{rd}$ generation partnership project (3GPP) network, long term evolution (LTE) network, $5^{th}$ generation partnership project (5GPP) network, a world interoperability for microwave access (WiMAX) network, Internet, a local area network (LAN), wireless LAN (WLAN), a wide area network (WAN), a personal area network (PAN), a Bluetooth network, a near-field communication (NFC) network, a satellite broadcasting network, an analog broadcasting Network, a digital multimedia broadcasting (DMB) network, and the like, but are not limited thereto.

Electronic devices in which the service user applications 2200, 3200, and 4200 and the service provider applications 2300, 3300, and 4300 are installed may be implemented as electronic devices that may access a remote server or terminal through a network. For example, the electronic devices, which are wireless communication devices that guarantee portability and mobility, may include all kinds of handheld-based wireless communication devices such as a navigation device, a personal communication system (PCS), a global system for Mobile communications (GSM), a personal digital cellular (PDC), a personal handyphone system (PHS), a personal digital assistant (PDA), international mobile telecommunication (IMT)-2000, code division multiple access (CDMA)-2000, W-CDMA, a wireless broadband Internet (Wibro) terminal, a smartphone, a smart pad, a tablet PC, and the like.

The servers 2100, 3100, and 4100 and the call recommendation system 1000 may be implemented as a computer that may access a remote server or terminal through a network. Here, the computer may include, for example, a navigation system, a notebook equipped with a web browser, a desktop, a laptop, and the like. Additionally, the call recommendation system 1000 of the present disclosure may provide a service by interworking with existing applications.

Figure 2:
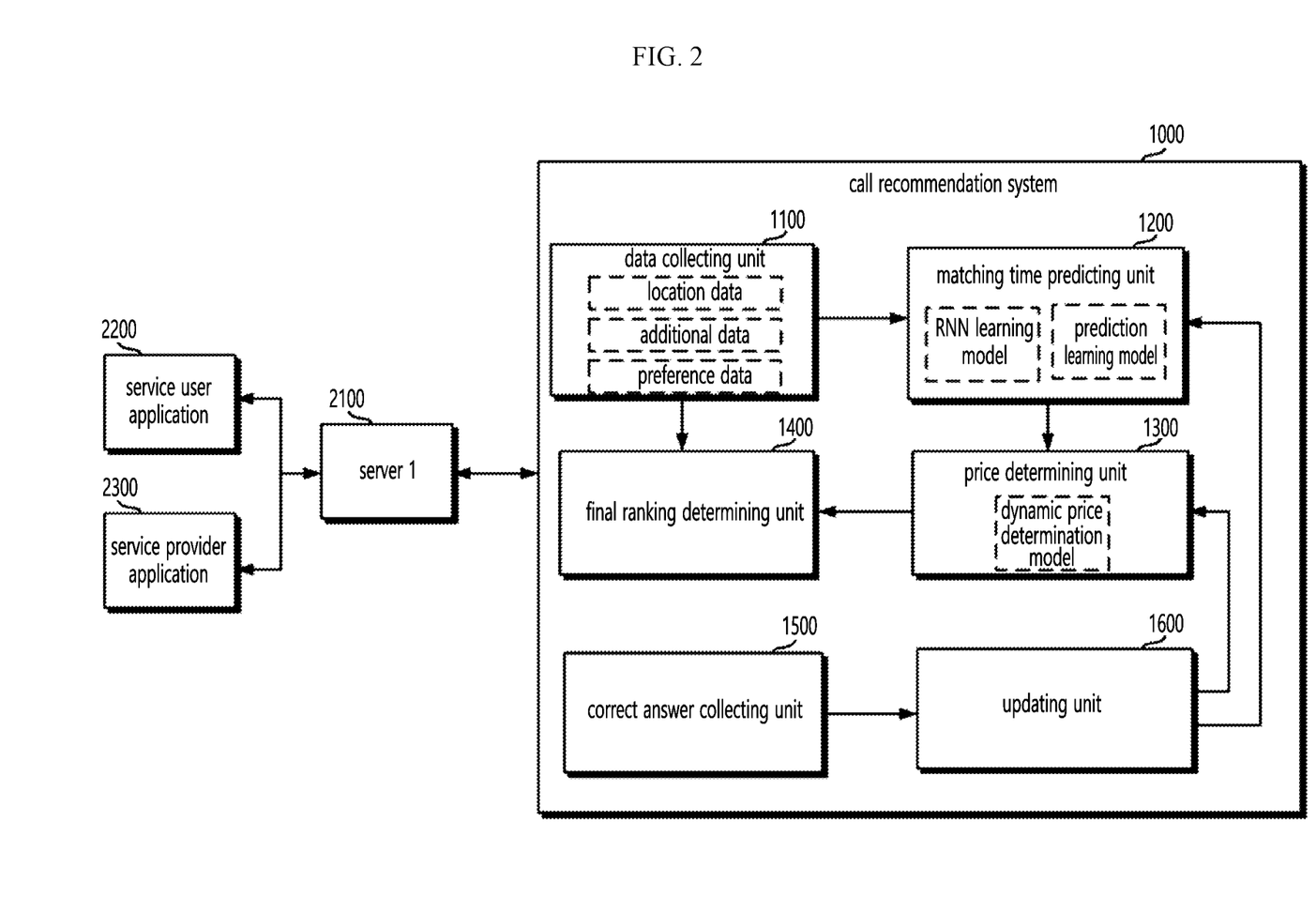
FIG. 2 is a block diagram illustrating a structure of the call recommendation system of FIG. 1.

FIG. 2 is a block diagram illustrating a structure of the call recommendation system of FIG. 1.

The call recommendation system 1000 may include a data collecting unit 1100, a matching time predicting unit 1200, a price determining unit 1300, a final ranking determining unit 1400, a correct answer information collecting unit 1500, and an updating unit 1600. In the present disclosure, the term "unit" includes a unit realized by hardware, a unit realized by software, and a unit realized using both. Further, one unit may be realized by using two or more hardware, or two or more units may be realized by one piece of hardware. In addition, the call recommendation system 1000 may additionally include a component not shown in FIG. 2 or may not include some of the components 1100 to 1600 shown in FIG. 2.

The call recommendation system 1000 may include a memory, a processor, and a communication unit. Memory may include at least one type of storage medium such as a flash memory type, hard disk type, multimedia card micro type, card type memory (for example, SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, optical disk. The processor may include one or more devices that decode and execute instructions, such as a CPU (Central Processing Unit), a microprocessor, and a GPU (Graphics Processing Unit). Communication unit may include Bluetooth communication unit, BLE (Bluetooth Low Energy) communication unit, Near Field Communication unit, WLAN (Wi-Fi) communication unit, Zigbee communication unit, Infrared (Infrared Data Association) communication unit, WFD (Wi-Fi) Direct) communication unit, UWB (ultra-wideband) communication unit, and an Ant+ communication unit, but is not limited thereto.

The call recommendation system 1000 may be implemented as a computing device including a memory, a processor, and a communication unit. For example, the data collecting unit 1100 may collect data through a communication unit or process the collected data using information stored in a memory. The matching time predicting unit 1200, the price determining unit 1300, the final ranking determining unit 1400, the correct answer collecting unit 1500, and the updating unit 1600 execute instructions stored in the memory through a processor to perform each operation. The memory may store information about a deep learning-based learning model (specifically, RNN learning model, predictive learning model).

The call recommendation system 1000 may dynamically determine a price considering each preference by using an AI-based algorithm even when data on an external environment, a service provider, and a service user changes in real time.

The call recommendation system 1000 may receive a call from the server 2100. When the call is received, the data collecting unit 1100 may receive location data of a service user and location data of a service provider from the server 2100. The location data of the service user may include present data on a present location of the service user and past data on a past location of the service user. The location data of the service provider may include present data on a present location of the service provider and past data on a past location of the service provider.

For example, the data collecting unit 1100 may receive location information of a service user by time. When a time at which the data collecting unit 1100 receives location information of the service user is a first time, a present location of the service user may be a location of the service user at the first time. In this case, a past location of the service user may be a location of the service user by time at a time before the first time. Specifically, the data collecting unit 1100 may receive past data on a location of the service user at each of a second time, a third time, . . . , and Nth time. In this case, the second time, the third time, . . . , the Nth time may be different times before the first time. Here, "N" may be an integer of 3 or greater. The location data of the service provider may also be collected in the same manner as the location data of the service user.

As another example, the data collecting unit 1100 may receive location information of a service user for each time interval. When a time at which the data collecting unit 1100 receives location information of the service user is a first time, a present location of the service user may be an average location of the service user in a first time interval including the first time. In this case, a past location of the service user may be an average location of the service user for each time interval at a time before the first time interval. Specifically, the data collecting unit 1100 may receive past data regarding an average location of the service user at each of a second time interval, a third time interval, . . . , Nth time interval. In this case, the second time interval, the third time interval, . . . , the Nth time interval may be different time intervals before the first time interval. Here, "N" may be an integer of 3 or greater. The data collecting unit 1100 may also collect location data of a service provider in the same manner as the location data of the service user. A time length of each of the first time interval, the second time interval, . . . , the Nth time interval and a magnitude of "N" may be changed by the updating unit 1600. The updating unit 1600 may change the time length of the first time interval, the second time interval, . . . , the Nth time interval and the magnitude of "N" so that prediction accuracy of the matching time predicting unit 1200 is increased based on correct answer information.

The data collecting unit 1100 may output the location data received from the server 2100 to the matching time predicting unit 1200. Hereinafter, the location data is interpreted as including the past and present location data of the service user and the past and present location data of the service provider. The matching time predicting unit 1200 may predict future locations of the service user and the service provider by inputting the location data into a recurrent neural network (RNN) learning model. The data collecting unit 1100 may generate prediction data of the service user indicating a future location of the service user and prediction data of the service provider indicating a future location of the service provider using the RNN learning model. Hereinafter, the prediction data is interpreted as including future location data of the service user and future location data of the service provider.

The RNN learning model may be a deep learning algorithm used to predict future locations of the service user and the service provider based on past and present locations of the service user and the service provider. For example, the RNN learning model may be one of an RNN algorithm, a convolution neural network (CNN)-RNN algorithm, a long short term memory (LSTM) algorithm, and a CNN-LSTM algorithm.

The matching time predicting unit 1200 may predict future locations of the service user and the service provider using the CNN-RNN algorithm. The CNN-RNN algorithm may be an artificial intelligence algorithm that predicts future locations of the service users and the service provider based on location data which has been converted into image data.

In addition, the matching time predicting unit 1200 may predict future locations of the service user and the service provider using the CNN-LSTM algorithm. The CNN-LSTM algorithm may also be an artificial intelligence algorithm that predicts future locations of the service user and the service provider based on location data which has been converted into image data. The LSTM algorithm may be an algorithm improved from the RNN algorithm. The matching time predicting unit 1200 may operate based on a deep learning algorithm capable of deriving future data using past and present data, but is not limited thereto.

The data collecting unit 1100 may receive additional data from the server 2100. The additional data may be additional information on the service user and the service provider. The additional data may include information related to a service requested by the service user, such as a departure point of the service user, a destination of the service user, a time required for the service provider to perform a service, a driving distance from the departure point to the destination, and the like. In addition, the additional data may include time information from a mid- to long-term perspective such as a time at which the service is requested, a day of the week in which the service is requested, whether a date at which the service is requested is a holiday, a season of the date at which the service is requested, and the like. The additional data is not limited thereto and may also include information on a location and status of the service provider.

The matching time predicting unit 1200 may receive the additional data from the data collecting unit 1100. The matching time predicting unit 1200 may convert the additional data into vector data by embedding it. In the following descriptions, "vector data" refers to data obtained by converting the additional data into a vector format.

The matching time predicting unit 1200 may input the prediction data and the vector data into a prediction learning model, and, when a service provider selects a specific service, matching time predicting unit 1200 may predict a matching time required until a next service user is matched after the selected service is performed. In this disclosure, when the service provider selects a currently received call, the "matching time" refers to a time taken until a next call is matched after the currently received call is performed. However, the present disclosure is not limited thereto, and "matching time" may refer to a time taken from when the service provider starts to perform the currently received call until a next call is matched, when the service provider selects the currently received call.

The prediction learning model may be a learning model based on a deep learning algorithm for predicting a matching time based on the future locations of the service user and the service provider and the additional data. The matching time predicting unit 1200 may rank currently received calls in order, starting from a shortest matching time, based on the prediction learning model. The matching time predicting unit 1200 may output matching time information of the calls to the price determining unit 1300.

The price determining unit 1300 may determine the price of each of the calls by inputting the matching time information into a dynamic price determination model. The price of each of the calls may be dynamically determined based on a matching time and a waiting time. For example, the price of a call may increase as a square value of the matching time of the call increases and may increase as the waiting time of the call increases. In the present disclosure, the "waiting time" may refer to a time during which a call is not approved by the service provider. That is, the "waiting time" may refer to a time during which the service user who received the call is not matched with the service provider. However, the present disclosure is not limited thereto, and the price determining unit 1300 may determine the price of the call to be proportional to a value of a resource used by the service provider to perform a service. A method of determining the price of a call by the price determining unit 1300 will be described in detail with reference to FIG. 6.

The price determining unit 1300 may determine ranks of calls in order, starting from a call with the highest price. The price determining unit 1300 may output price information of the calls to the final ranking determining unit 1400.

The final ranking determining unit 1400 may receive the price information of the calls from the price determining unit 1300. In addition, the final ranking determining unit 1400 may receive preference data from the data collecting unit 1100. The preference data may indicate a preference of the service provider for a service. For example, the service provider may not prefer a corporate call, may not prefer a foreign car if a car of a service user is the foreign car, may not prefer a distance between a current location of the service provider to a departure location of a service user greater than a predetermined distance, may not prefer a nearby destination, or may not prefer a case where a service user does not have a fellow passenger. The preference data may include information on the preferences of the service provider.

The final ranking determining unit 1400 may determine a final ranking of the calls based on the price information and the preference data of the calls. The final ranking determining unit 1400 may filter the calls based on the preference data for calculation efficiency. For example, the final ranking determining unit 1400 may determine only the final ranking of calls excluding some calls that the service provider does not want.

The final ranking determining unit 1400 may determine a final score of each of the remaining calls based on the preference of the service provider for the call price and the call matching time. The final ranking determining unit 1400 may determine the final ranking of the remaining calls in order, starting from the final ranking having the highest final score. The final score of the call may increase according to an increase in the price of the call and/or a decrease in the matching time of the call. In addition, the final score of the call may decrease according to a decrease in the price of the call and/or an increase in the matching time of the call.

The final ranking determining unit 1400 may transmit final ranking information on the final ranking of the calls to the service provider application 2300 through the server 2100.

The service provider may receive final ranking information of the calls through the service provider application 2300. The service provider may select a call that suits his or her preference among calls through the service provider application 2300 based on the final ranking information of the calls. The service provider may provide a service corresponding to the selected call to a service requester.

After the service is completed, the correct answer information collecting unit 1500 may receive correct answer information from the server 2100. In this disclosure, "correct answer information" may represent actual results for situations predicted by the call recommendation system 1000. For example, when the call recommendation system 1000 predicts locations of the service provider and the service user at a first time, the correct answer information may include information on the actual locations of the service provider and the service user at the first time. As another example, the correct answer information may include information on a service actually selected by the service provider among services recommended to the service provider and an actual matching time taken until the service provider is matched with a next service user after the selected service is performed. The correct answer information collecting unit 1500 may output the received correct answer information to the updating unit 1600.

The updating unit 1600 may receive correct answer information from the correct answer information collecting unit 1500. The updating unit 1600 may update the data collecting unit 1100, the matching time predicting unit 1200, the price determining unit 1300, and the like to improve prediction accuracy of the call recommendation system 1000 based on the correct answer information.

The updating unit 1600 may change the amount of data collected by the data collecting unit 1100 and a format of data based on the correct answer information. As an example, when the data collecting unit 1100 collects data on an average location of the service user in each of the first time interval to the Nth time interval, time lengths of the time intervals (the first time interval to the Nth time interval) and/or a size of "N" may be changed according to an updating operation of the updating unit 1600.

The updating unit 1600 may train deep learning-based learning models (RNN learning model, prediction learning model) of the matching time predicting unit 1200 based on the correct answer information. Due to the updating operation of the updating unit 1600, the prediction accuracy of the matching time predicting unit 1200 may be improved.

The updating unit 1600 may update the dynamic price determination model of the price determining unit 1300 based on the correct answer information. When there is a change in the preference of the service provider, the price determining unit 1300 may determine a dynamic price reflecting the changed preference of the service provider according to the updating operation of the updating unit 1600.

In other words, the present disclosure may be used in a field of a proxy service system, a field of a personalized recommendation algorithm, a field of demand prediction, and a field of dynamic price determination algorithm. In the present disclosure, a matching time may be predicted based on a deep learning algorithm. In the present disclosure, a rate of operation of service providers, an expected profit cost of each individual, and individual cost efficiency may be increased by rating calls in consideration of the predicted matching time and the preference of the service provider.

In addition, in the present disclosure, a phenomenon that a non-preferred call is not matched may be solved using the dynamic price determination algorithm that determines a price in consideration of the matching time, and both the service provider and the service user may be satisfied with reasonable price fluctuations according to supply and demand laws. In the present disclosure, a matching rate between the service providers and the service users may be increased by recommending a call reflecting the preferences of the service providers.

Figure 3:
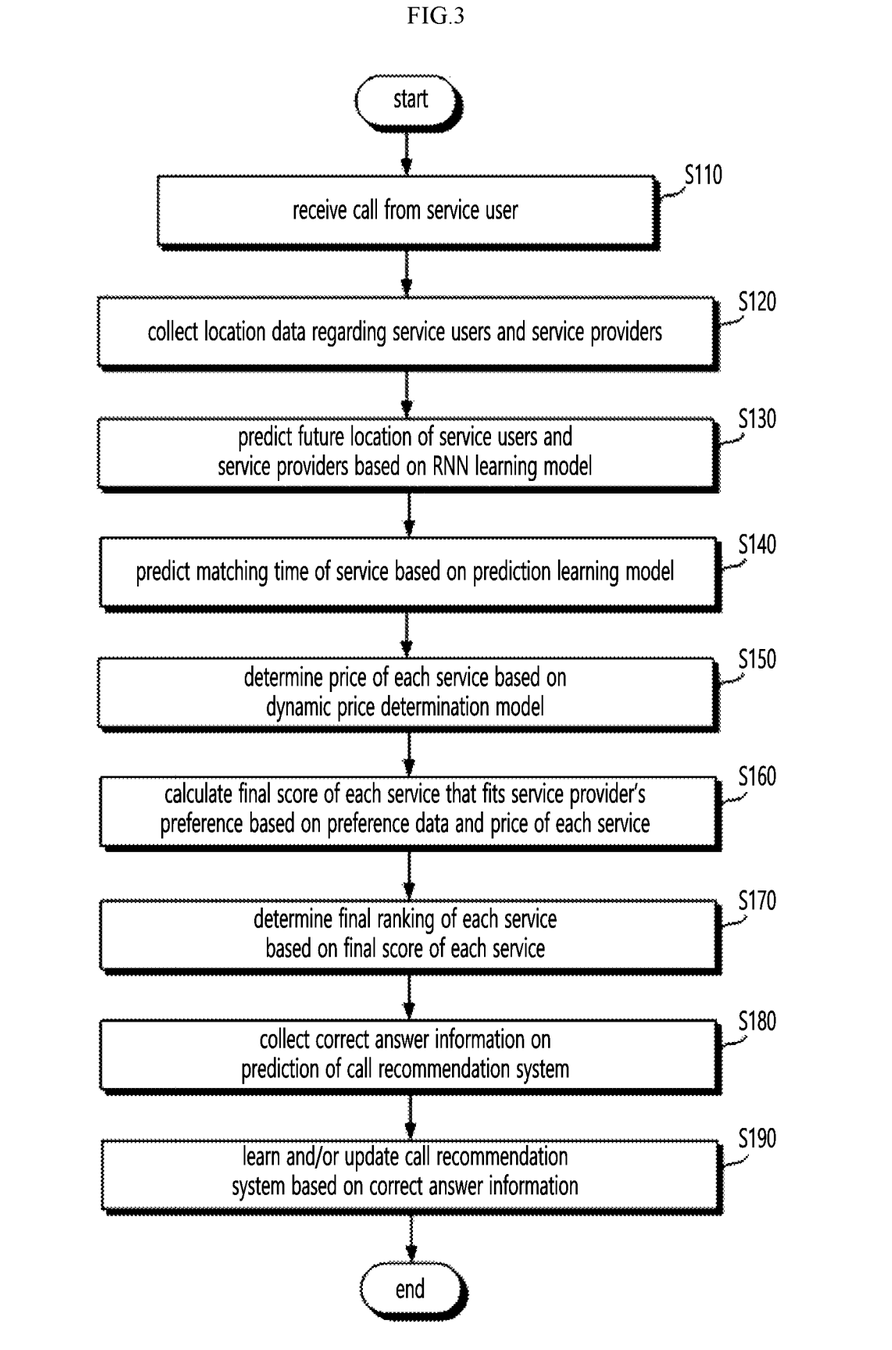
FIG. 3 is a flowchart illustrating operations of the call recommendation system of FIG. 2.

FIG. 3 is a flowchart illustrating operations of the call recommendation system of FIG. 2.

In operation S110, the call recommendation system 1000 of FIG. 2 may receive a call from a service user.

In operation S120, when the call is received, the call recommendation system 1000 may collect location data of service users and service providers. Specifically, the recommendation system 1000 may collect past location data and present location data of the service users and the service providers.

In operation S130, the call recommendation system 1000 may predict future locations of the service users and the service providers based on the location data and an RNN learning model.

In operation S140, the call recommendation system 1000 may predict a service matching time based on the future locations of the service users and the service providers, additional data, and a prediction learning model. The "additional data" and "matching time" have been described above with reference to FIG. 2, and thus a redundant description thereof will be omitted.

In operation S150, the call recommendation system 1000 may determine a price of each of the services based on the dynamic price determination model. The price of a service may increase as the square of the service matching time predicted in operation S140 increases. Also, the price of a service may increase as a waiting time of the service increases. The "waiting time" has been described above with reference to FIG. 2, and thus a redundant description thereof will be omitted.

In operation S160, the call recommendation system 1000 may calculate a final score of each of the services that suit the preference of the service provider based on the preference data and the price of each of the services. Specifically, the call recommendation system 1000 may filter out calls that the service provider does not prefer based on the preference data. The call recommendation system 1000 may calculate a final score of each of the calls preferred by the service provider. The final score of a service increases as the price of the service increases and may decrease as the matching time of the service increases.

In operation S170, the call recommendation system 1000 may determine a final ranking of the services in order, starting from a service having the highest final score. The service provider may select at least one of the services by referring to the final ranking of the services. The service provider may perform the selected service.

After the service provider performs the selected service, in operation S180, the call recommendation system 1000 may collect correct answer information on prediction. The "correct answer information" has been described above with reference to FIG. 2, and thus a redundant description thereof will be omitted.

In operation S190, the call recommendation system 1000 may update the components 1100 to 1400 of the call recommendation system 1000 based on the correct answer information. Specifically, the call recommendation system 1000 may train deep learning-based learning models stored in the call recommendation system 1000 by using the correct answer information. Accordingly, prediction accuracy of the call recommendation system 1000 may be improved.

Figure 4:
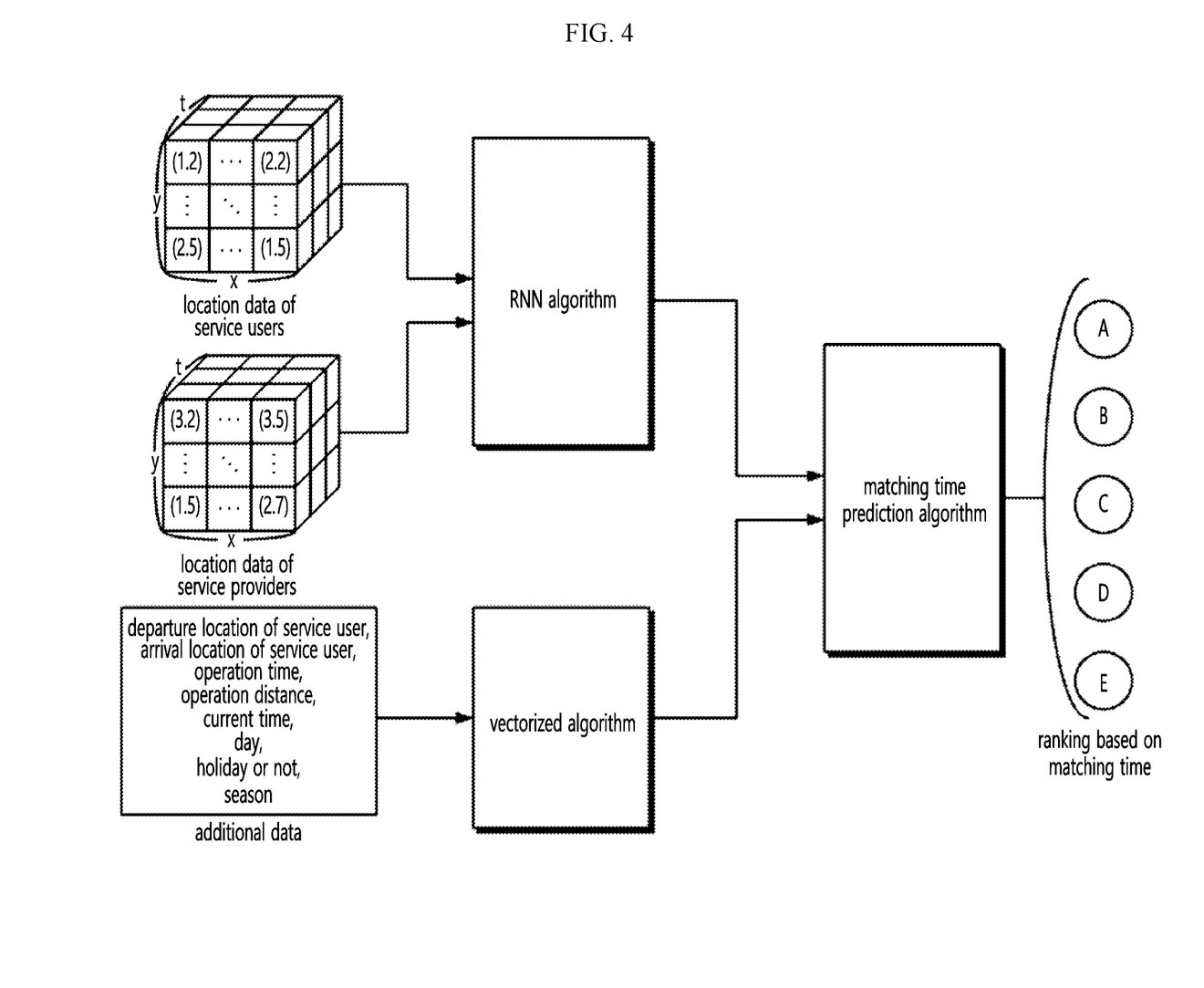
FIG. 4 is a flowchart illustrating an operation of a matching time predicting unit of FIG. 2.

FIG. 4 is a flowchart illustrating an operation of the matching time predicting unit of FIG. 2.

The matching time predicting unit 1200 of FIG. 2 may receive location data from the data collecting unit 1100. The location data collected from the data collecting unit 1100 may include location information of service users according to time and location information of service providers according to time. The matching time predicting unit 1200 may convert the locations of the service users and the locations of the service providers from the past to the present into data in a specific time unit. Specifically, the location data of the service provider may indicate an average location of the service provider in each of time intervals from a first time interval to Nth time interval. For example, a time length of each of the time intervals may be 30 minutes, and "N" may be 8. In this case, the matching time predicting unit 1200 may predict the location of the service provider in 30 minutes based on the location of the service provider for the past 4 hours. The location data may be in the form of a matrix, and location coordinates of the service provider may be displayed in each entry. One matrix may represent an average location of the service providers in a specific time interval. The location data of the service user may also be in a form similar to the location data of the service provider.

The matching time predicting unit 1200 may input the location data of the service users and the location data of service providers into an RNN algorithm. As mentioned above, the present disclosure is not limited thereto, and the matching time predicting unit 1200 may use an LSTM algorithm among the RNN algorithms. The matching time predicting unit 1200 may predict future locations of the service users and future locations of the service providers using the RNN algorithm.

The matching time predicting unit 1200 may generate vector data by embedding additional data using a vectorized algorithm. The additional data may include service data related to a service and mid- to long-term data related to a date at which the service is requested. For example, the service data may include information on a departure point of a service user, a destination of the service user, a time required to perform the service, and a distance from the departure point to the destination. The mid- to long-term data may include information on a current time, a day of the week in which the service is requested, whether a date at which the service is requested is a holiday, and a season of the date at which the service is requested. The mid- to long-term data may be data for finding a location pattern of a service provider and a service user and an implicit pattern of calls from a mid-to-long term (e.g., weekly, monthly, yearly) perspective. The additional data may be used as information for improving prediction accuracy for future locations of the service users and the service providers and/or matching time.

The matching time predicting unit 1200 may input result data and vector data output from the RNN algorithm into the matching time prediction algorithm. The matching time predicting unit 1200 may predict a matching time of calls using a matching time prediction algorithm. The matching time predicting unit 1200 may determine ranks of calls in order, starting from the shortest predicted matching time.

Figure 5:
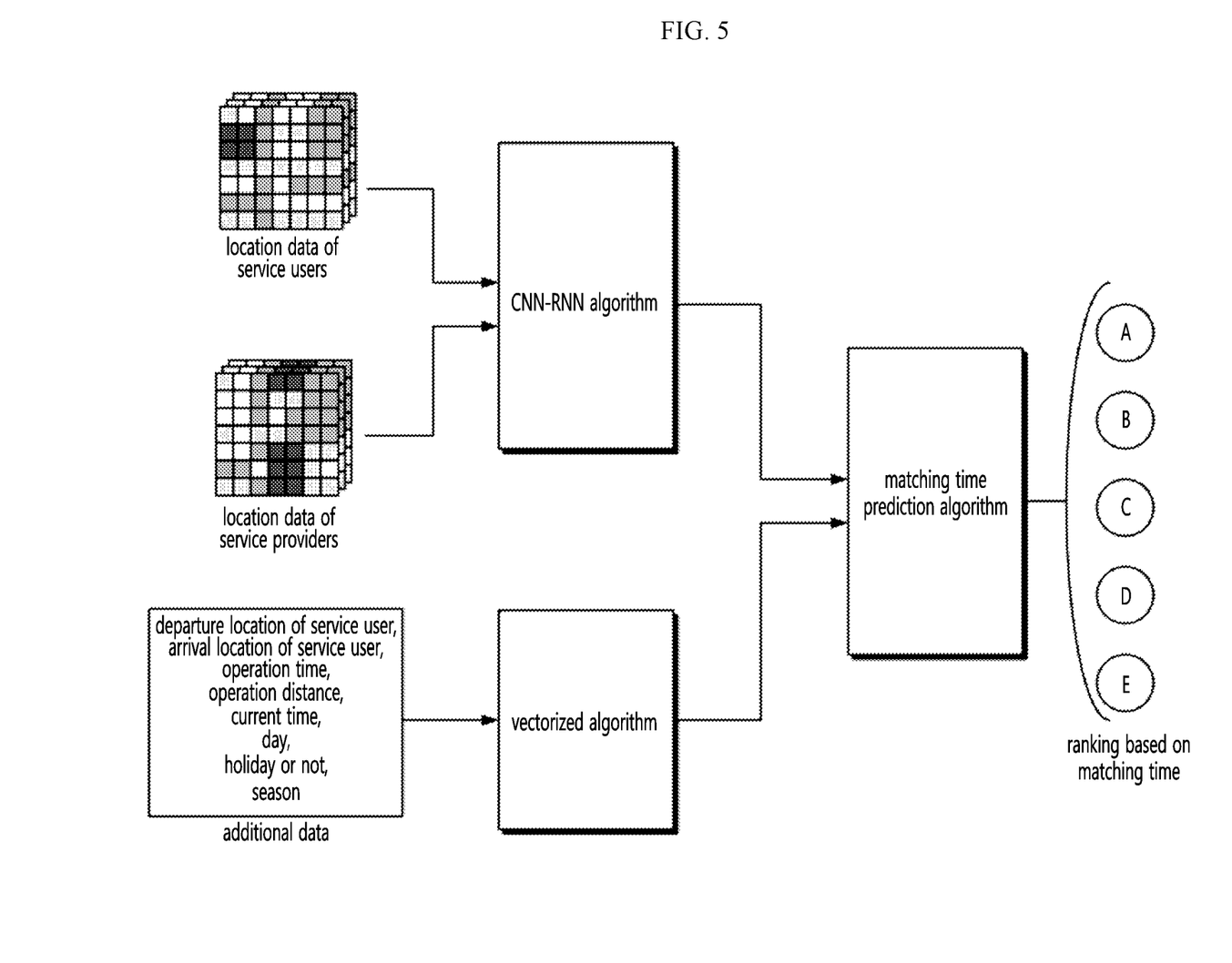
FIG. 5 is a flowchart illustrating an operation of the matching time predicting unit of FIG. 2.

FIG. 5 is a flowchart illustrating an operation of the matching time predicting unit of FIG. 2.

The matching time predicting unit 1200 of FIG. 2 may receive location data from the data collecting unit 1100. The location data collected from the data collecting unit 1100 may include location information of the service users according to time and location information of the service providers according to time. The method of collecting the location data by the matching time predicting unit 1200 may be substantially the same as the method described above with reference to FIG. 4. Thus, a redundant description thereof will be omitted.

The matching time predicting unit 1200 may convert the locations of the service users and the locations of the service providers from the past to the present into a two-dimensional (2D) heat map form according to a specific time unit.

The matching time predicting unit 1200 may use location data of the service users and the location data of the service providers in the form of a heat map as input data of the CNN-RNN algorithm. As mentioned above, the present disclosure is not limited thereto, and the matching time predicting unit 1200 may use a CNN-LSTM algorithm among CNN-RNN algorithms. The matching time predicting unit 1200 may predict future locations of the service users and future locations of the service providers using the CNN-RNN algorithm.

In substantially the same manner as described above with reference to FIG. 4, the matching time predicting unit 1200 may predict a matching time of calls using result data and vector data output from the CNN-RNN algorithm. The matching time predicting unit 1200 may determine the ranks of calls in order, starting from the shortest predicted matching time.

Figure 6:
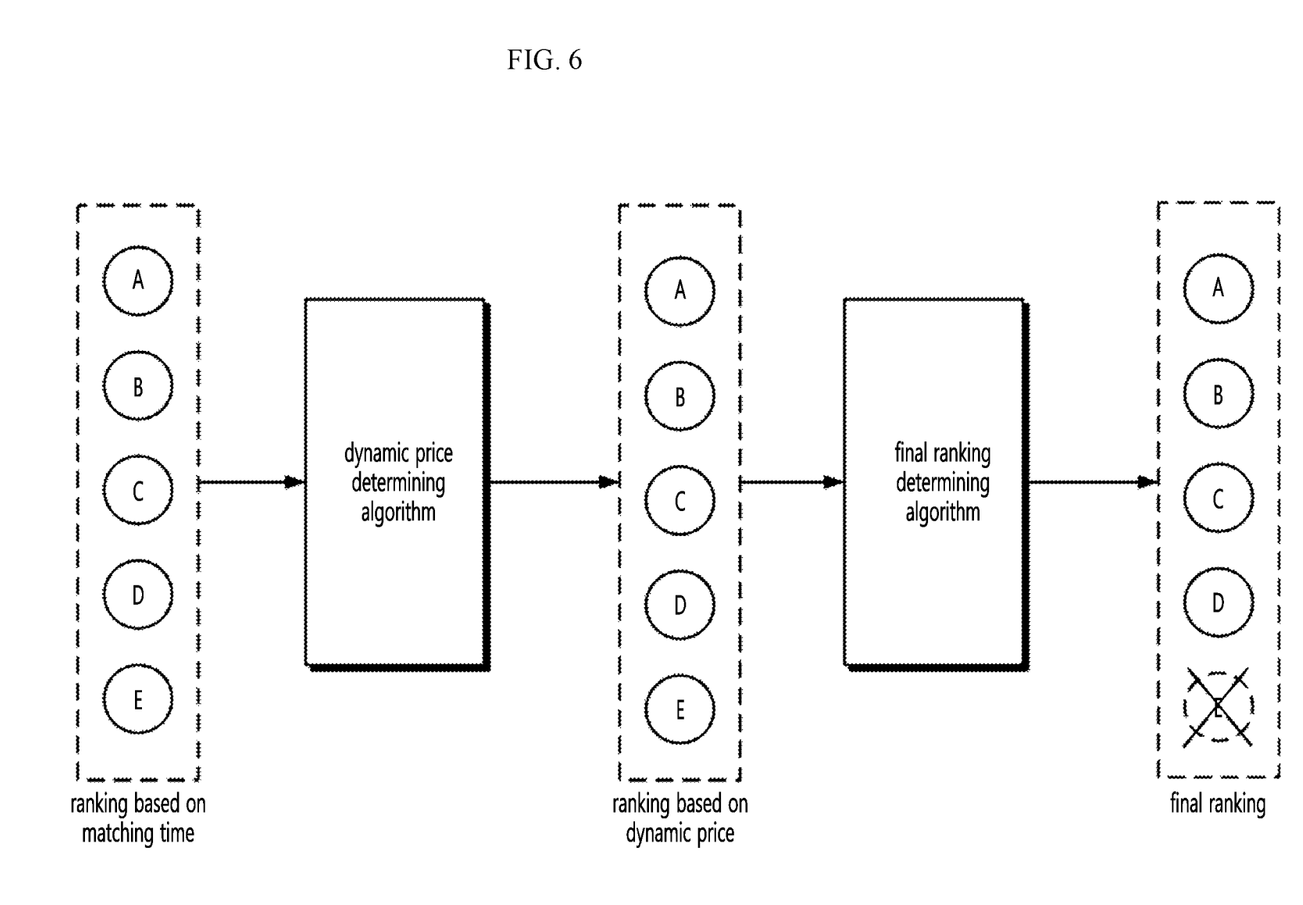
FIG. 6 is a conceptual diagram illustrating an operation of a price determining unit and a final ranking determining unit of FIG. 2.

FIG. 6 is a conceptual diagram illustrating an operation of a price determining unit and a final ranking determining unit of FIG. 2.

The price determining unit 1200 of FIG. 2 may determine prices of calls using a dynamic price determination algorithm. The price determining unit 1200 may calculate the price of calls using [Equation 1] below.

$$P_t(Di) = (\omega(l_t) \times (l_t(Di) \times P_{t-1}(Di))) + (\omega(W_{t+1}) \times (W_{t+1}(Di)^2)) \quad \text{[Equation 1]}$$

[Equation 1] may be an equation for obtaining a price of a service at time "t". Referring to [Equation 1], "$P_t(Di)$" may be a price of a service at time "t". "$P_{t-1}(Di)$" refer to a price of the service at time "t−1". Time "t−1" may refer to a time in the past earlier than time "t". The price determining unit 1300 of FIG. 2 may periodically update the price of the service. In this case, "$P_{t-1}(Di)$" may refer to a price of the service before the price of the service is updated to "$P_t(Di)$". "$L_t(Di)$" may refer to a waiting time during which the service is not matched. "$W(l_t)$" may refer to a weight that the waiting time may affect the price of the service. That is, the price of the service $P_t(Di)$ may increase as the waiting time $l_t(Di)$ of the service increases.

Referring to [Equation 1], "$W_{t+1}(Di)$" may refer to a matching time required until the service provide is matched with another service after completion of a corresponding service. "$w(W_{t+1})$" may refer to a weight that the matching time will affect the price of the service. The weights $w(l_t)$ and $w(W_{t+1})$ may be determined according to a preference for a high price of the service provider and a preference for a short matching time. That is, the price $P_t(Di)$ of the service may increase as a square value $W_{t+1}(Di)^2$ of the matching time of the service increases.

That is, the price of the service $P_t(Di)$ may increase as the waiting time $l_t(Di)$ of the service and the matching time $W_{t+1}(Di)$ of the service increase. In this disclosure, an increase in "X" in proportion to "Y" refers to an increase in "Y" as "X" increases. A long waiting time $l_t(Di)$ of the service refers to that service providers do not prefer the corresponding service. A service with a long matching time $W_{t+1}(Di)$ is also likely not preferred by the service providers. Therefore, in the present disclosure, since the price $P_t(Di)$ of the service increases as the waiting time $l_t(Di)$ and the matching time $W_{t+1}(Di)$ of the service increase, an occurrence of an unwanted call which is not selected by the service provider may be reduced, thus improving quality of the service of the present disclosure.

The price determining unit 1200 may determine dynamic prices of the services A, B, C, D, and E. Referring to FIG. 6, the services A, B, C, D, and E may be listed in order of "C", "D", "E", "A", and "B", starting from the highest dynamic price.

As mentioned above, the price determining unit 1200 may periodically update the dynamic price of the service. In this process, a new service may be added to the rating target according to a request of the service user, and when a service provider selects a service, the selected service may be excluded from the rating target. In addition, in this process, the dynamic price of a service with an increased waiting time and/or matching time may increase. Accordingly, the rating of services may be changed according to the dynamic prices.

The final ranking determining unit 1400 of FIG. 2 may receive price information on dynamic prices of the services A, B, C, D, and E. The final ranking determining unit 1400 may receive preference data from the data collecting unit 1100 of FIG. 2. The final ranking determining unit 1400 may filter out the service D that does not suit the preference of the service provider based on the preference data. The final ranking determining unit 1400 may improve calculation efficiency by determining final rankings of the remaining services A, B, C, and E excluding the service D.

The final ranking determining unit 1400 may calculate a final score for each of the services A, B, C, and E using Equation 2 below. The final ranking determining unit 1400 may determine a final ranking of the services A, B, C, and E in order, starting from a service with the highest final score.

$$Ri=(m(P_t)*P_t(Di))-(m(W_{t+1})*W_{t+1}(Di)) \quad \text{[Equation 2]}$$

[Equation 2] may be an equation for obtaining a final score Ri of the service. As described above with reference to [Equation 1], "$P_t(Di)$" may be the price of the service at time "t", and "$W_{t+1}(Di)$" may be a matching time required for the service provider to be matched with a next servicer after completion of a corresponding service. "$m(P_t)$" may refer to a weight that the price of the service may affect the final score of the service. "$m(W_{t+1})$" may refer to a weight that the matching time of the service may affect the final score of the service. The weights $m(P_t)$, $m(W_{t+1})$ may be determined according to the preference of the service provider for a high price and the service provider's non-preference for a high matching time.

Referring to [Equation 2], the final score of the service may decrease as the price decreases and/or the matching time increases. In addition, the final score of the service may increase as the price increases and/or the matching time decreases. The final score of the service may increase as the price increases and may decrease as the matching time increases. That is, the final score of the service is not limited to the present disclosure and may be determined by an equation configured such that the final score of the service increases as the price increases and decreases as the matching time increases. For example, the final score of the service may be determined by [Equation 3] below.

$$Ri=(m_1(P_t)*P_t(Di))/(m_1(W_{t+1})*W_{t+1}(Di)) \quad \text{[Equation 3]}$$

Referring to [Equation 3], "$m_1(P_t)$" may refer to a weight that the price of a service may affect the final score of the service. "$m_1(W_{t+1})$" may refer to a weight that the matching time of the service may affect the final score of the service.

The final ranking determining unit 1400 may determine a final score of each of the services A, B, C, and E. Referring to FIG. 6, the services A, B, C, and E may be listed in order of "C", "E", "A", and "B", starting from a service with the highest final score.

In addition, the call recommendation system 1000 may be used to solve a problem of price determination caused by a demand/supply imbalance and difficulty in predicting demand of not only transportation services but also on-demand-based shared economic services. The call recommendation system 1000 may predict the demand for an on-demand-based sharing economy service based on AI. The call recommendation system 1000 may be a dynamic pricing system that determines a price of a service using predicted demand and various information received in real time. The call recommendation system 1000 may provide a variety of information for determining a price through AI-based demand prediction to providers who share idle resources of the sharing economy platform, and recommend an optimal price. The call recommendation system 1000 may recommend a personalized price based on a usage history to a consumer who uses the sharing economy service. For example, the method of determining the final price in the call recommendation system 1000 may be used in a shared kitchen service based on a food delivery service. In this case, the information used for price determination may be external environmental factors (e.g., weather, surrounding area events, SNS information, ratings and reviews, etc.).

The contents described above are specific examples for carrying out the present disclosure. The present disclosure may include not only the embodiments described above but also embodiments that may be simply changed in design or easily changed. In addition, the present disclosure may also include techniques that can be easily modified and implemented using the embodiments. Therefore, the scope of the present disclosure should not be limited to the embodiments described above and should be determined by the claims and equivalents of the present disclosure as well as the claims to be described later.

What is claimed is:

1. A call recommendation system comprising:
a data collecting unit configured to, when a service is requested from a service user, collect first past data indicating a past location of the service user, first present data indicating a present location of the service user, second past data indicating a past location of a service provider, and second present data indicating a present location of the service provider;
a matching time predicting unit configured to input the first and the second past data and the first and the second present data to a recurrent neutral network (RNN) leaning model to predict a future location of the service user and a future location of the service provider and to input first prediction data regarding the future location of the service user and second prediction data regarding the future location of the service provider to a prediction learning model to predict, when the service provider selects a service, a matching time required until the service provider is matched with a next service user after the service provider completes the service;
a price determining unit configured to determine a price for the service such that the price increases as the matching time increases; and
a final ranking determining unit configured to determine a recommendation rating of a service among services required for the service provider based on preference data indicating preference of the service provider regarding a service and a price,
wherein each of the RNN learning model and the prediction learning model is based on a deep learning algorithm,
wherein the matching time predicting unit configured to execute instructions stored in a memory using a processor, and predict the matching time based on the RNN learning model and the prediction learning model by executing the instructions, wherein the matching time predicting unit is configured to receive service data regarding the service and long-term data regarding a date at which the service is requested, to vectorize the service data and the long-term data to generate vector data, and to input the vector data, the first prediction data, and the second prediction data into the prediction learning model to predict the matching time,
wherein the service data includes information on a departure point of the service user, a destination of the service user, a time required for performing the service, and a distance from the departure point to the destination, and
the long-term data includes information on a current time, a day of the week in which the service is requested, whether a date at which the service is requested is a holiday, and a season of the date at which the service is requested.

2. The call recommendation system of claim 1, wherein the matching time predicting unit is configured to generate the first prediction data and the second prediction data using the RNN learning model based on a convolution neutral network (CNN)-long-short term memory (LSTM) algorithm.

3. The call recommendation system of claim 1, wherein the price determining unit is configured to adjust the price according to Equation 1 below if the service user is not matched with a service provider which uses the call recommendation system for a specific period of time, $$\text{the adjusted price} = (\text{first weight})*(\text{waiting time in which the service user is not matched with the service provider which uses the call recommendation system})*(\text{the price}) + (\text{second weight})*(\text{the matching time})^2. \quad \text{Equation 1:}$$

4. The call recommendation system of claim 1, wherein the final ranking determining unit is configured to determine whether the service suits the preference of the service provider based on the preference data, to calculate a score of the service according to Equation 2 if the service suits the preference, and to determine the recommendation rating of the service according to the score, $$\text{the calculated score} = (\text{first weight})*(\text{the price}) - (\text{second weight})*(\text{the matching time}) \quad (\text{Equation 2})$$

(the first weight and the second weight are constants related to the preference of the service user regarding each of the price and the matching time).

5. The call recommendation system of claim 1, wherein the final ranking determining unit is configured to determine whether the service suits the preference of the service provider based on the preference data, to calculate a score of the service according to Equation 3 if the service suits the preference, and to determine the recommendation rating of the service according to the score, $$\text{the calculated score} = ((\text{first weight})*(\text{the price}))/((\text{second weight})*(\text{the matching time})) \quad (\text{Equation 3})$$

(the first weight and the second weight are constants related to the preference of the service user regarding each of the price and the matching time).

6. The call recommendation system of claim 1, wherein the first present data indicates an average location of the service user in a first time interval,
the second present data indicates an average location of the service provider in the first time interval,
the first prediction data indicates the future location at which the service user is predicted to be present at a second time after the first time interval, and
the second prediction data indicates the future location at which the service provider is predicted to be present at the second time,
wherein the call recommendation system further comprising:
a correct answer information collecting unit configured to collect correct answer information regarding a location where the service user is actually located at the second time, a location where the service provider is actually located at the second time, a service selected by the service provider among the services, and an actual matching time taken for the service provider to be matched with a next service user after the selected service is performed; and
an updating unit configured to update the data collecting unit, the matching time predicting unit, the price determining unit, and the final ranking determining unit based on the correct answer information.

7. The call recommendation system of claim 6, wherein
the first past data indicates an average location of the
service user at each of a plurality of time intervals,
the second past data indicates an average location of the
service provider at each of the plurality of time intervals,
the plurality of time intervals are different time intervals
before the first time interval, and
the updating unit is configured to update the data collecting unit such that the number of the plurality of time intervals and a time length of each of the plurality of time intervals are adjusted based on the correct answer information.

8. The call recommendation system of claim 1, wherein
the matching time predicting unit is configured
to generate the first prediction data and the second prediction data using the RNN learning model based on a convolution neutral network (CNN)-long-short term memory (LSTM) algorithm,
to receive service data regarding the service and long-term data regarding a date at which the service is requested,
to vectorize the service data and the long-term data to generate vector data, and
to input the vector data, the first prediction data, and the second prediction data into the prediction learning model to predict the matching time,
the price determining unit is configured
to adjust the price if the service user is not matched with a service provider which uses the call recommendation system even after a predetermined period of time has passed, to adjust the price such that the adjusted price=(first weight)*(waiting time during which the service user is not matched with the service provider which uses the call recommendation system)* (the price)+(second weight)*(the matching time)$^2$, the final ranking determining unit is configured
to determine whether the service suits the preference of the service provider based on the preference data,
to calculate a score of the service to be increased as (first weight)*(the adjusted price) increases and to be decreased as (second weight)*(the matching time) increases, if the service suits the preference, and
to determine the recommendation rating of the service according to the score of the service,
wherein the service data includes information on a departure point of the service user, a destination of the service user, a time required for performing the service, and a distance from the departure point to the destination, and
the long-term data includes information on a current time, a day of the week in which the service is requested, whether a date at which the service is requested is a holiday, and a season of the date at which the service is requested,
the first weight and the second weight are determined according to a preference of the service user for each of the adjusted price and the matching time,
the first present data indicates an average location of the service user in a first time interval,
the second present data indicates an average location of the service provider in the first time interval,
the first prediction data indicates the future location at which the service user is predicted to be present at a second time after the first time interval, and
the second prediction data indicates the future location at which the service provider is predicted to be present at the second time,
wherein the call recommendation system further comprising:
a correct answer information collecting unit configured to collect correct answer information regarding a location where the service user is actually located at the second time, a location where the service provider is actually located at the second time, a service selected by the service provider among the services, and an actual matching time taken for the service provider to be matched with a next service user after the selected service is performed; and
an updating unit configured to update the data collecting unit, the matching time predicting unit, the price determining unit, and the final ranking determining unit based on the correct answer information.

9. A call recommendation method implemented by executing instructions stored in memory using a processor, the call recommendation method comprising:
collecting, by the call recommendation system, first past data indicating a past location of a service user, first present data indicating a present location of the service user, second past data indicating a past location of a service provider, and second present data indicating a present location of the service provider, when a service is requested from the service user;
inputting, by the call recommendation system, the first past data, the first present data, the second past data, and the second present data to a recurrent neural network (RNN) learning model to predict a future location of the service user and a future location of the service provider and inputting first prediction data regarding a future location of the service user and second prediction data regarding a future location of the service provider into a prediction learning model to predict a matching time required until the service provider is matched with a next service user after the service provider completes the service;
calculating, by the call recommendation system, a price for the service such that the price increases as the matching time for the service increases; and
determining, by the call recommendation system, a recommendation rating of the service among services required for the service provider based on preference data indicating a preference of the service provider regarding the service and the price, wherein the RNN learning model and the prediction learning model are based on a deep learning algorithm, wherein the matching time predicting unit is configured to receive service data regarding the service and long-term data regarding a date at which the service is requested, to vectorize the service data and the long-term data to generate vector data, and to input the vector data, the first prediction data, and the second prediction data into the prediction learning model to predict the matching time,
wherein the service data includes information on a departure point of the service user, a destination of the service user, a time required for performing the service, and a distance from the departure point to the destination, and
the long-term data includes information on a current time, a day of the week in which the service is requested, whether a date at which the service is requested is a holiday, and a season of the date at which the service is requested.

\* \* \* \* \*